United States Patent [19]

Pierce et al.

[11] Patent Number: 5,533,384
[45] Date of Patent: Jul. 9, 1996

[54] APPARATUS FOR INSPECTING AN ENGINE VALVE SEAT

[75] Inventors: James H. Pierce, Commerce Township; Robert J. Sayig, II, Livonia, both of Mich.

[73] Assignee: Intra Corporation, Westland, Mich.

[21] Appl. No.: 398,559

[22] Filed: Mar. 3, 1995

[51] Int. Cl.⁶ .................................................. G01M 3/00
[52] U.S. Cl. ............................ 73/47; 73/49.7; 73/119 R
[58] Field of Search .................................... 73/116, 118.2, 73/119 R, 47, 49.6, 49.7, 49.8

[56] References Cited

U.S. PATENT DOCUMENTS

| | | | |
|---|---|---|---|
| 1,455,077 | 5/1923 | Coffman | 73/47 |
| 1,462,115 | 7/1923 | Lauster | 73/47 |
| 1,701,876 | 2/1929 | Fleming | 73/47 |
| 1,764,616 | 6/1930 | Fleming | 73/47 |
| 2,212,466 | 8/1940 | Bradford | 73/47 |
| 2,328,289 | 8/1943 | Morgan et al. | 73/47 |
| 2,352,350 | 6/1944 | Smith | 73/47 |
| 2,573,646 | 10/1951 | Koestering | 73/47 |
| 2,748,598 | 6/1956 | Sterns | 73/47 |
| 3,442,443 | 5/1969 | Kilbourn | 73/47 |
| 3,563,084 | 2/1971 | Shaffer | 73/47 |
| 3,874,225 | 4/1975 | Fegel | 73/47 |
| 3,973,429 | 8/1976 | Durgan et al. | 73/49.7 |
| 4,213,328 | 7/1980 | Roeschlaub et al. | 73/49.7 |
| 4,428,228 | 1/1984 | Banzhaf et al. | 73/47 |
| 4,617,824 | 10/1986 | Cybulski et al. | 73/49.7 |
| 4,698,999 | 10/1987 | Trick et al. | 73/49.7 |
| 5,095,738 | 3/1992 | Roeschlaub | 73/49.7 |
| 5,272,911 | 12/1993 | Beggs et al. | 73/47 |

Primary Examiner—Richard Chilcot
Assistant Examiner—Eric S. McCall
Attorney, Agent, or Firm—Alex Rhodes

[57] ABSTRACT

An apparatus for measuring the ovality, concentricity and runout of an engine valve seat which is comprised of a datum plate, an air gage head, a pot master, a compressed air source, a signal processing device, and a display unit. The compressed air source, signal processing device and the display unit are conventional. One characteristic feature of the invention is the datum plate for limiting the angular displacement of the air gage head during a measurement of an engine valve seat. A second characteristic feature of the invention is that the air gage head "floats" in the air gage body if a measurement is within an established limit for the measurement. A third characteristic feature of the invention is a self-aligning pilot at an end portion of the gage head.

11 Claims, 3 Drawing Sheets

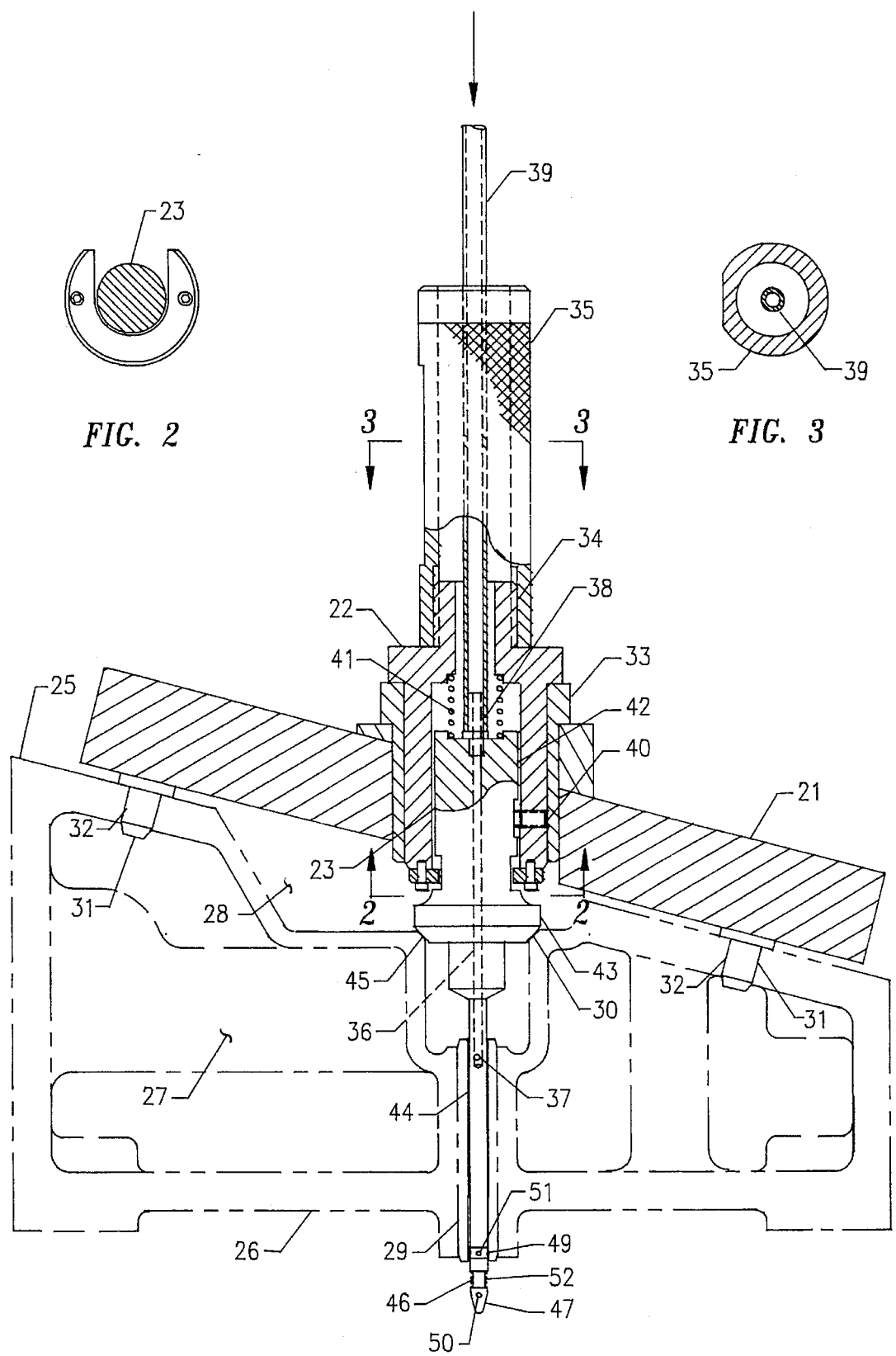

APPARATUS FOR INSPECTING AN ENGINE VALVE SEAT

FIELD OF THE INVENTION

This invention relates to measuring devices and more particularly to an apparatus for inspecting an engine valve seat.

BACKGROUND OF THE INVENTION

Engine valves are vital parts of an engine. They control the flow of gases in and out of engine cylinders. Their sealing affects the horsepower, fuel economy, balance and emissions of an engine. The valves reciprocate back and forth in valve guides to open and close intake and exhaust passages which communicate with engine cylinders. Their tapered valve faces contact narrow tapered surfaces in engine heads or blocks, commonly referred to as valve seats to seal the intake and exhaust passages from the cylinders during compression and power strokes of the engine.

If valves do not fit properly in the tapered seats, intake and exhaust passages will not be sealed off during compression and power strokes, causing power losses, reduced fuel economy, rough engine idling and increased pollution. Imperfect sealing also reduces valve and valve seat life by allowing hot exhaust gases, when peak temperatures occur during ignition, to leak and contact valve faces and valve seats. It can also accelerate valve guide wear, causing increased oil consumption.

Imperfect sealing occurs when valve seat runout, ovality and concentricity exceed required tolerances. Measurements of runout, ovality and concentricity have been inconsistent, especially when made by different inspectors. A repeatable apparatus is needed for checking the close tolerances of valve seats and guides during the manufacturing process. The large number of valve seats in an engine requires an improved apparatus which is efficient and easy to use.

SUMMARY OF THE INVENTION

The present invention is an apparatus for measuring the ovality, concentricity and runout of an engine valve seat. One benefit of the invention is that measurements are repeatable. Another benefit of the invention is that measurements can be quickly and easily made.

The invention resides in features which individually and collectively contribute to its ability to quickly and reliably measure the accuracy of engine valve seats and guides. The invention broadly comprises a compressed air source, a signal processing device, a display unit, a datum plate, an air gage head, and a pot master. The compressed air source, signal processing device and the display unit are conventional.

One characteristic feature of the invention is the use of a datum plate. A second characteristic feature of the invention is that the air gage head "floats" in the air gage body if a measurement is within an established limit. A third characteristic feature of the invention is a self-aligning pilot which is attached to an end portion of the gage head.

In one aspect of the invention, the invention is used for measuring the ovality of a valve seat. In a second aspect of the invention, the invention is used for measuring concentricity and the runout between a valve seat and a valve guide.

Further benefits and features of the invention will become apparent from the ensuing detailed description and drawings which disclose the invention. The property in which exclusive rights are claimed is set forth in each of the numbered claims at the conclusion of the detailed description.

BRIEF DESCRIPTION OF THE DRAWINGS

The invention will be better understood and further objects, characteristic features, details and advantages thereof will appear more clearly with reference to the diagrammatic drawings illustrating a presently preferred specific embodiment of the invention by way of non-limiting example only.

FIG. 1 shows an engine head in phantom and a front view of an apparatus in partial cross-section for measuring the accuracy of a valve seat and guide of the engine head, according to the invention.

FIG. 2 is a cross-sectional view taken on the line 2—2 in FIG. 1.

FIG. 3 is a cross-sectional view taken on the line 3—3 in FIG. 1.

DETAILED DESCRIPTION OF THE PREFERRED EMBODIMENT

Figure 5:
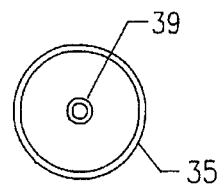
FIG. 5 is a plan view of the apparatus shown in FIG. 4.

Referring now to the drawings wherein like numerals designate like and corresponding parts throughout the several views, an apparatus for inspecting an engine valve seat, according to the invention is generally designated by the numeral 20. The apparatus broadly comprises, a datum plate 21, an air gage body 22, an air gage head 23, a pot master 24, a compressed air source, a signal processing device, and a display unit. The compressed air source, signal processing device, and display unit are conventional components of an air gage measuring system, it being our intention to only claim these devices in combination with other elements of our invention.

Air gage measuring systems are common and well known in the art. Basically, in air gaging, a jet of air is discharged from an orifice or ball jet toward a surface which is near the orifice or ball jet. The restrictive effect produced as the surface approaches the orifice or ball jet has a well-defined relation to the clearance between the two. This effect is processed and displayed for measurement purposes.

The datum plate 21 is a characteristic feature of our invention and is shown in FIG. 1. The datum plate 21 rests on a mounting face 25 of a cylinder head 26 which is shown in phantom. It should be noted that when valves are located in an engine block, the datum plate 21 will be placed on the engine block. The cylinder head 26 is conventional and has a passage 27 which communicates with an intake or exhaust manifold and a combustion chamber 28 of a cylinder. Only the combustion chamber 28 is depicted in the drawing, the remaining portion of the cylinder being located in an engine block (not shown).

A conventional valve (not shown) reciprocates upwardly and downwardly in a valve guide 29 to open and close the passage 27 to the cylinder. The passage 27 to the cylinder is closed when a tapered face of the valve is in contact with a tapered valve seat 30 of the cylinder head.

A pair of dowel (locating) pins 31 are press fitted into the datum plate 21 and engage master machining holes 32 which a manufacturer typically provides in the cylinder head 26. The machining holes 32 are used by the manufacturer to locate the head 26 in the stations where valve seats, valve guide bores and other cylinder head details are machined.

Heretofore, the usual practice for inspecting a valve seat has been for an inspector to engage and rotate an air gage head, commonly referred to as a "gage plug", in the valve seat and valve guide without the assistance of an alignment device. This practice has been unsatisfactory and has produced results which have often been inconsistent, particularly when the valve seat has been inspected by different inspectors. This has created a great deal of uncertainty, making it difficult for a manufacturer to maintain quality control and schedule machine maintenance.

Referring to FIG. 1, a bushing 33 is press fitted into the datum plate 21 on a theoretical centerline of the valve seat 30 and valve guide 29. In the same manner, other bushings (not shown) are pressed into the datum plate 21 on the centerlines of the other valve seats.

The air gage body 22 and air gage head 23 which the bushing 33 receives make up an assembly which is rotatable in the datum plate bushing 33. The gage body 22 is a cylindrical member having a threaded upper portion 34, joined to a cylindrical handle 35. An aperture 36 extends from the top of the gage head 23 to a cross-drilled air orifice 37 in the gage head 23. A tube fitting 38 is connected to the upper end of the gage head 23 and receives an end of a tube 39 which operatively connects the gage head 23 to the compressed air source, signal processing device and display unit. The air gage head 23 is restrained from rotating in the air gage body 22 by a set screw 40. A helical spring 41 between the gage body 22 and upper end of the gage head 23 resiliently loads the gage head 23 against the valve seat 30.

The gage head 23 is comprised of an upper portion 42 which is positioned in the gage body 22, an intermediate portion 43 which corresponds to the head of the valve, and a lower portion 44 is positioned in the valve guide 29. The rim of intermediate portion 43 is tapered and the tapered portion 45 is shown in contact with the valve seat 30. The tapered rim portion 45 of the gage head 23 in this embodiment is preferably crowned to allow the gage head 23 to slightly rotate in the valve seat 30.

Figure 6:
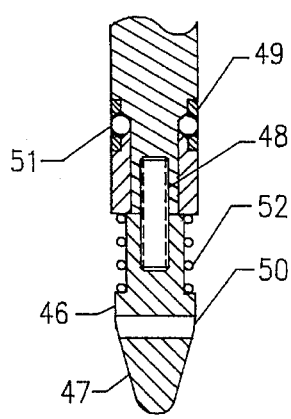
FIG. 6 is an enlarged cross-sectional view taken on the line 6—6 in FIG. 4.

A second characteristic feature of the invention is that the gage head 23 floats in the gage body 22 if the measurement taken is within a permissible limit. This feature is accomplished by providing a clearance of about 15 to 25 one-thousandths (0.015–0.025) of an inch between the upper portion of the gage head 23 and gage body 22. A specific clearance is calculated by stacking-up the tolerances of the cylinder head 26, datum plate 21, gage body 22 and gage head 23 to prevent contact of the gage head 23 with the gage body 22 if the measurement is within the permissible limit. Another characteristic feature of the invention is a self aligning pilot 46 which is attached to the end of the gage head 23. With reference to FIG. 6, the self aligning pilot 46 is comprised of a tapered end piece 47, a stud 48 for attaching the tapered end piece 47 to the gage head 23 and a ball arbor 49. The tapered end piece 47 is assembled to the gage head 23 by inserting a short length piece of a standard drill rod (not shown) through a cross hole 50 and rotating the end piece 47.

The construction of the conventional ball arbor 49 is best understood by reference to FIG. 6. The arbor's balls 51 are loaded outwardly against the inner surface of the valve guide by a helical spring 52.

Figure 11:
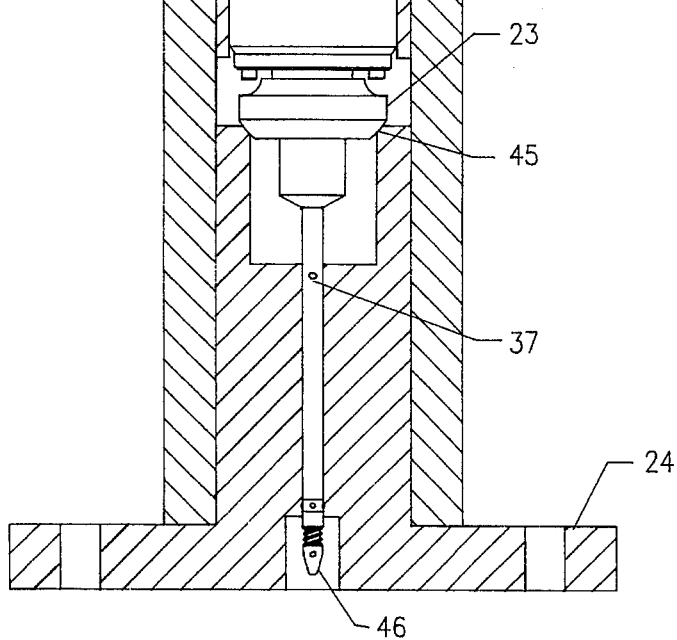
FIG. 11 is a cross-sectional view taken on the line 11—11 in FIG. 10.

The invention is used for checking valve seat runout with respect to the valve guide as follows. Referring to FIG. 11, the air gage body 22 and head 23 are mounted in the pot master 24 to calibrate the signal processing device and display unit. The pot master 24 simulates the valve seat 30 and guide 29 at a maximum allowable runout. Similar pot masters are provided for checking ovality and concentricity. With reference to FIG. 1, the datum plate 21 is next placed on the cylinder head 26, and the dowel pins 31 are engaged with the master holes 32. The gage head 23 and body 22 are inserted into the datum plate bushing 33 and the tapered rim 45 of the gage head 23 is engaged with the valve seat 30. When the tapered rim 45 of the gage head 23 is in full contact with the valve seat 30, the air orifice 37 and ball arbor 49 are adjacent to the upper and lower ends of the valve guide 29.

Compressed air is introduced into the gage head 23 and the gage head body 22 and gage head 23 are rotated with the handle 35 to measure and display the runout on the display unit.

Figure 8:
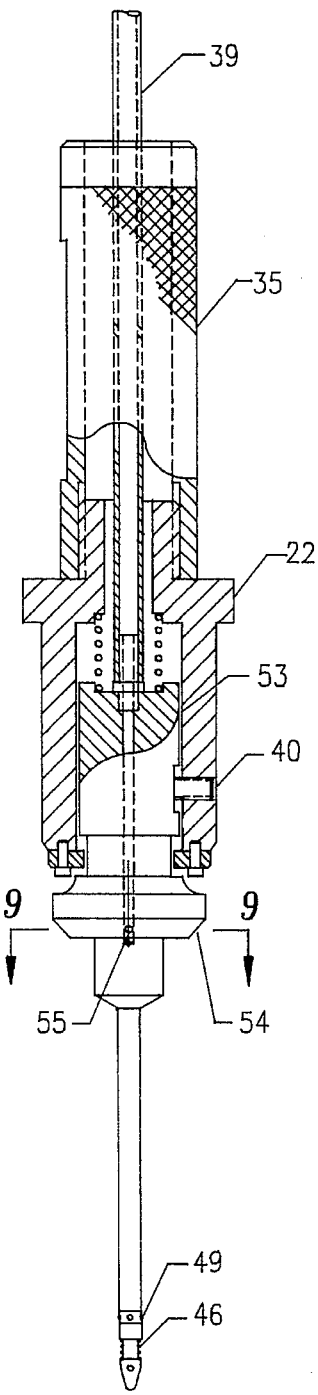
FIG. 8 is a front view of an alternate embodiment of the gage head and gage body of the apparatus shown in FIG. 1.
Figures 9, 9A:
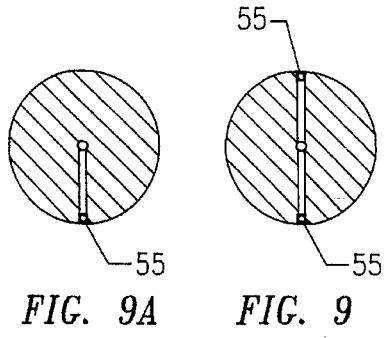
FIG. 9 is an enlarged cross-sectional view taken on the line 9—9 in FIG. 8 showing the pair of ball orifices for checking valve seat ovality.
FIG. 9A is an enlarged cross-sectional view taken on the line 9—9 in FIG. 8 showing the single ball orifice for checking valve seat ovality.
Figure 7:
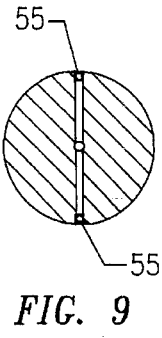
FIG. 7 is an enlarged cross-sectional view taken on the line 7—7 in FIG. 4.
Figure 4:
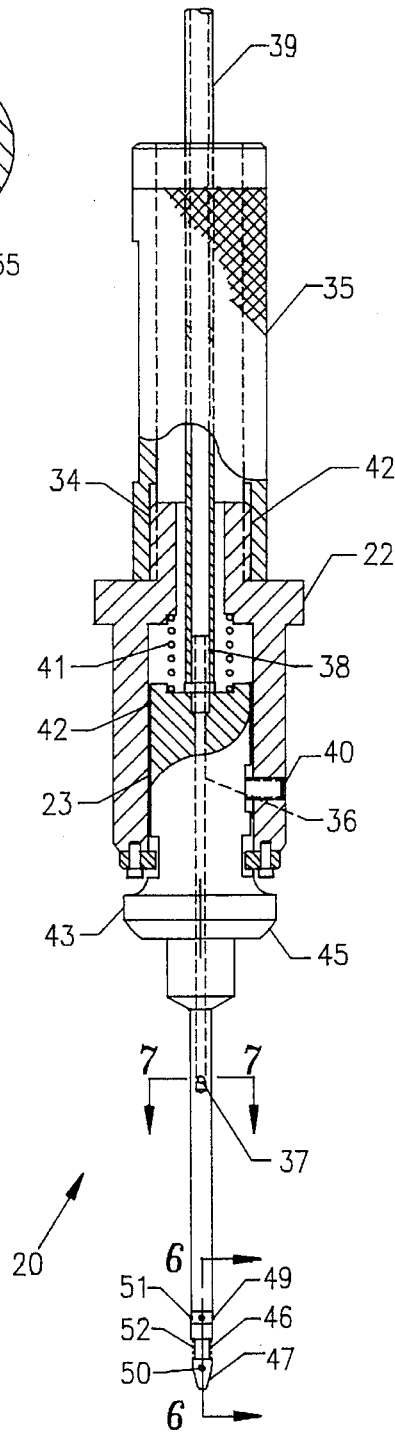
FIG. 4 is a front view of the gage head and gage body of the apparatus for measuring the accuracy of a valve seat and guide shown in FIG. 1.
Figure 10:
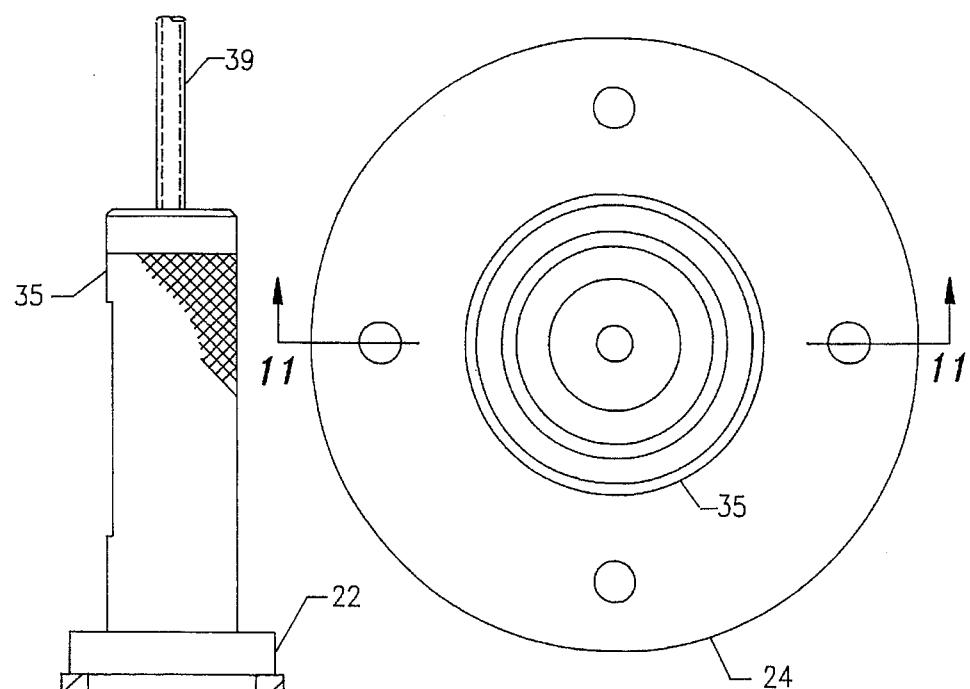
FIG. 10 is a plan view of the gage head and gage body shown in FIG. 1 and a pot master for calibrating the apparatus.

In FIGS. 8 and 9 are shown a gage head 53 for checking the ovality of the valve seat 30. The gage head 53 is similar to the gage head 23 (shown in FIGS. 1 and 4) for checking runout, except for a straight tapered rim 54 rather than the crowned tapered rim 45 of the earlier embodiment and a pair of conventional ball jets 55 in the tapered rim 54 rather than the open orifice 37. For this measurement, a ball jet is preferable over an open orifice because of the valve seat's narrow width. The ovality is measured by introducing compressed air into the gage head 53 and rotating the gage head 53 to measure and display the ovality on the display unit.

In FIG. 9A is shown a modification to the embodiment, shown in FIGS. 8 and 9, for checking the concentricity of the valve seat 30. For this measurement, a single ball jet 55 is provided in the tapered rim 54 of the gage head rather than a pair of ball jets. Compressed air is introduced into the gage head and the gage head is rotated to measure and display the concentricity on the display unit.

From the foregoing, it will be understood that our invention satisfies the need for an efficient, easy to use apparatus for inspecting an engine valve seat.

Although but two embodiments of our invention have been illustrated and described, it will be appreciated that other embodiments can be developed without departing from the spirit thereof.

We claim:

1. An apparatus for measuring a runout, ovality or concentricity of an engine valve seat with respect to a valve guide comprising: a datum plate for positioning an air gage head on an engine cylinder head or an engine block in a predetermined position relative to an engine valve seat and mounting an air gage body for rotating an air gage head about an axis of said engine valve seat; an air gage body mounted for rotation in said datum plate, said air gage body having an aperture for receiving an upper portion of an air gage head; an air gage head, said air gage head having an upper portion mounted in said air gage body, an intermediate, tapered, outward extending portion for engaging a tapered engine valve seat, and a lower cylindrical portion for engaging a valve guide, said upper portion having an outer surface which allows said air gage head to be angularly displaced within said aperture of said air gage body, if during said rotation of said air gage head a measurement taken with said apparatus of runout, ovality or concentricity is within an established tolerance limit, said air gage head further having at least one aperture for discharging a jet of air; a cylindrical handle attached to a threaded upper portion of said air gage body for rotating said air gage body; a source of compressed air; a signal processing device operatively connected to said air gage head; and a display unit operatively connected to said signal processing device for displaying a measurement of the runout, ovality and concentricity of said engine valve seat when said air gage head is engaged with and rotated in said engine valve seat and said engine valve guide during said measurement of said runout, ovality or concentricity of said engine valve seat.

2. The apparatus recited in claim 1 further comprising a ball arbor attached to an end portion of said lower portion of said air gage head.

3. The apparatus recited in claim 1 further comprising a tapered self aligning pilot attached to an end portion of said Lower portion of said air gage head, said self aligning pilot comprised of a tapered end piece, a means for attaching said tapered end piece to said air gage head, and a ball arbor mounted on an outside surface of said end portion of said air gage head adjacent to said tapered end piece of said pilot.

4. The apparatus recited in claim 1 further comprising a pot master for calibrating said signal processing device and said display unit.

5. The apparatus recited in claim 1 wherein said tapered rim portion of said gage head is crowned and only a single aperture is provided for discharging said jet of air, said aperture being located in said intermediate tapered cylindrical portion of said air gage head, for measuring the runout of said valve seat with respect to said valve guide.

6. The apparatus recited in claim 5 further comprising a second aperture in said intermediate tapered cylindrical portion of said air gage head for discharging a second jet of air to measure the ovality of said valve seat.

7. The apparatus recited in claim 1 wherein said aperture for discharging said jet of air is located in said lower portion of said air gage head for measuring the concentricity of said valve seat with respect to said valve guide.

8. The apparatus recited in claim 1 further comprising a means for resiliently loading a tapered rim portion of said gage head against tapered valve seat.

9. In an apparatus for measuring a runout, ovality or concentricity of an engine valve seat with respect to a valve guide of a type having an air gage head, said air gage head having an upper portion mounted in an aperture of an air gage body, an intermediate outward cylindrical tapered portion for engaging said valve seat and a cylindrical lower portion for engaging a valve guide, the improvement comprising a means for limiting an angular displacement of said intermediate tapered portion when said intermediate tapered portion of said air gage head is engaged with a tapered valve seat and rotated during a measurement of runout, ovality or concentricity of said valve seat if measurement is within an established tolerance limit.

10. The apparatus recited in claim 9 wherein said means for limiting said angular displacement of said intermediate tapered portion during said measurement of said engine valve seat comprises, a datum plate for positioning an air gage body on an engine cylinder head or an engine block in a predetermined position relative to said engine valve seat and rotating said air gage head about an axis of said engine valve seat; an air gage body for receiving an upper end portion of said air gage head, said air gage head being sized to provide a clearance space which allows said upper portion of said air gage head to be displaced in said body only if said measurement is within said established limit; and a self aligning pilot attached to a lower end portion of said air gage head, said self aligning pilot comprised of a tapered end piece, a means for attaching said tapered end piece to said air gage head, and a ball arbor mounted on an outside surface of said lower end portion of said air gage head.

11. An apparatus for measuring runout, ovality or concentricity of an engine valve seat with respect to a valve guide comprising a datum plate for positioning an air gage head at a predetermined location on an engine cylinder head or an engine block, said plate having a bushing for a rotatable mounting of an air gage body and a pair of dowel pins for locating said datum plate at said predetermined location; a generally cylindrical air gage body, said air gage body having an aperture for receiving an air gage head; an air gage head mounted in said air gage body, said aperture of said air gage body having a size which permits said air gage head to be displaced angularly when said air gage head is rotated during a measurement of runout, ovality or concentricity of said valve seat, if said measurement is within an established tolerance limit; an air gage head mounted in said air gage body, said air gage head having an upper portion mounted in said aperture of said air gage body, an intermediate outward extending tapered portion for contacting a tapered valve seat during said measurement of runout, ovality or concentricity, and a lower cylindrical portion for rotatably engaging an engine valve guide, at least one aperture for discharging a jet of air, and a self aligning pilot forming an end portion of said lower air gage head portion, said self aligning pilot comprised of a tapered end piece, a means for attaching said tapered end piece to said air gage head, and a ball arbor mounted on an outside surface of said end portion of said air gage head; a cylindrical handle attached to a threaded upper portion of said air gage body for rotating said air gage body together with said air gage body in said valve seat and said valve guide; a source of compressed air; a signal processing device operatively connected to said air gage head; and a display unit operatively connected to said signal processing device for displaying a measurement of the ovality, or runout and concentricity of said engine valve seat with respect to said valve guide when said air gage head is rotated.

\* \* \* \* \*